(12) United States Patent
Hilligsoe et al.

(10) Patent No.: US 7,501,927 B2
(45) Date of Patent: Mar. 10, 2009

(54) HIGH-POWER RESISTOR

(75) Inventors: Torben Hilligsoe, Kent (GB); Gerhard Pahlke, Gerolsbach (DE)

(73) Assignee: ELDIS Ehmki & Schmid oHG, Unterschleissheim (DE)

( * ) Notice: Subject to any disclaimer, the term of this patent is extended or adjusted under 35 U.S.C. 154(b) by 477 days.

(21) Appl. No.: 11/223,442

(22) Filed: Sep. 9, 2005

(65) Prior Publication Data

US 2006/0158797 A1   Jul. 20, 2006

(30) Foreign Application Priority Data

Sep. 9, 2004   (DE) .................. 10 2004 048 661

(51) Int. Cl.
*H01C 7/10*   (2006.01)
(52) U.S. Cl. ................... 338/22 R; 338/319; 338/53
(58) Field of Classification Search .......... 338/52–58, 338/61, 101, 104, 319, 22 R
See application file for complete search history.

(56) References Cited

U.S. PATENT DOCUMENTS

| | | | | | |
|---|---|---|---|---|---|
| 4,716,396 | A | * | 12/1987 | Kneifel | 338/226 |
| 4,727,351 | A | * | 2/1988 | Harris et al. | 338/308 |
| 5,039,976 | A | * | 8/1991 | Drabkin | 338/314 |
| 5,353,005 | A | * | 10/1994 | Salanki | 338/55 |
| 5,796,584 | A | * | 8/1998 | Myrberg | 361/707 |
| 6,924,726 | B2 | * | 8/2005 | Ekwall | 338/319 |

* cited by examiner

*Primary Examiner*—Kyung Lee
(74) *Attorney, Agent, or Firm*—Alleman Hall McCoy Russell & Tuttle LLP (57) ABSTRACT

An improved high-power resistor comprising a housing which can be or is traversed by a cooling medium and in which one or more resistance elements are provided.

16 Claims, 7 Drawing Sheets

HIGH-POWER RESISTOR

CROSS REFERENCE TO RELATED APPLICATION

This application claims priority to German Patent Application Serial No. DE 10 2004 048 661.1, filed Sep. 9, 2004, which is hereby incorporated by reference in its entirety for all purposes.

FIELD

The present application relates to a high-power resistor and a resistance unit which consists of a plurality of such high-power resistors.

BACKGROUND AND SUMMARY

High-power resistors are used in particular for braking electric motors, particularly in thyristor drives, especially high-frequency thyristor drives, but also for many other applications in the field of the control of electric drives. High-power resistors are also required especially in automotive engineering.

Known high-power resistors comprise a wire of a material having an electric resistance, which is wound around a core, the core generally being able to withstand high temperatures. There are also known high-power resistors made of a spiral wire which is not wound around a core. The wire is provided with an electric insulation. It is disposed in a thermally conductive material surrounded by a metallic housing which acts as heat exchanger.

In the known high-power resistors problems arise in particular when the operating frequency is high, for instance higher than 1 kHz, and/or when it is important to maintain the wave shape of the current. In the known power resistors the problems arise in particular as a result of the fact that they have a certain capacity and/or inductance by virtue of their construction, by which the shape and the format of the voltage signal and/or the current signal, which can for instance be rectangular or sinusoidal, can be impaired in an undesirable way.

It is an object of the present invention to provide an improved high-power resistor.

In accordance with the present invention, this object is solved by the features of claims 1 and 10. The high-power resistor comprises a housing which can be or is traversed by a cooling medium and in which a resistance element is provided. The cooling medium can be liquid or gaseous. Preferably, the cooling medium is liquid.

Advantageous embodiments are described in the dependent claims.

Preferably, the resistance element is planiform.

In the housing, a plurality of resistance elements, preferably three, can be provided. The resistance elements can be connected in parallel or in series. It is particularly advantageous when a plurality of planiform resistance elements are provided, which are arranged parallel to each other.

Preferably, separators are provided between the resistance elements. By means of the separators, the resistance elements can be isolated from each other. Furthermore, the separators can serve as conducting devices for the cooling medium. A particularly simple solution is obtained when planiform resistance elements are separated from each other by planiform separators.

Another advantageous embodiment is characterized in that the housing is made of plastic material, preferably of thermoplastic material. Such housing can be manufactured at low cost.

At the housing, connections can be provided, in particular tube connections for supplying and discharging the cooling medium.

Preferably, a terminal box is provided at the housing. The terminal box can include electric contacts for connecting electric lines.

Another advantageous embodiment is characterized by sealed connections for connecting the resistance element with the terminal box.

The present invention furthermore relates to a resistance unit which consists of a plurality of high-power resistors.

According to the embodiments described in the present application, a cooling-medium-cooled, in particular liquid-cooled high-power resistor is created. It provides for realizing a resistor with high performance values and in particular with low impedance and low induction. Particularly advantageously, the high-power resistor can be used for braking electric motors, in particular in high-frequency thyristor drives, but also in many other applications in the field of electric drive engineering, in particular the control of electric drives. Another important field of application is automotive engineering.

In particular in fields of application in which a low weight and/or a high packing density of the electric and/or electronic components is decisive, especially in the automotive industry, it is desirable to achieve a rather high power dissipation. This is required in particular during hard braking operations. At the same time, the required space should be minimized. The embodiments of the present invention provide for solving these problems.

BRIEF DESCRIPTION OF THE FIGURES

Embodiments of the present invention will be explained in detail below with reference to the attached figures, in which.

DETAILED DESCRIPTION

The high-power resistor as shown in the figures comprises a housing which consists of an upper housing part 1 and a lower housing part 1. The housing parts 1 are molded parts of thermoplastic material. They are bonded to each other and form a closed, pressure-resistant, sealed housing. As plastic material, there can for instance be used nylon 6.6 or nylon 4.6 with 30% nylon and 40% glass filler, as it is normally used in the automotive industry, but also other plastic materials.

Figure 1:
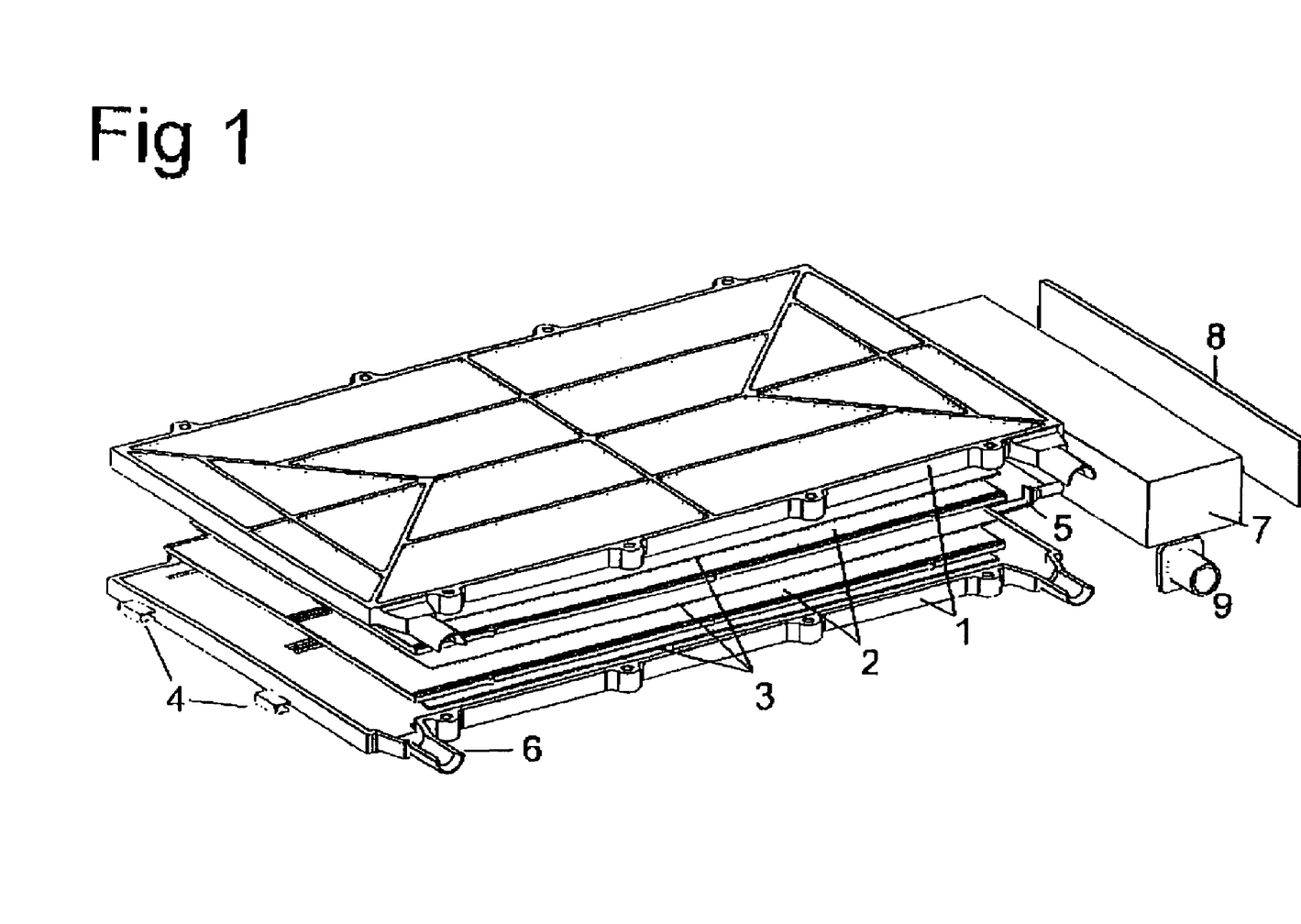
FIG. 1 shows a perspective exploded view of a high-power resistor.
Figure 2:
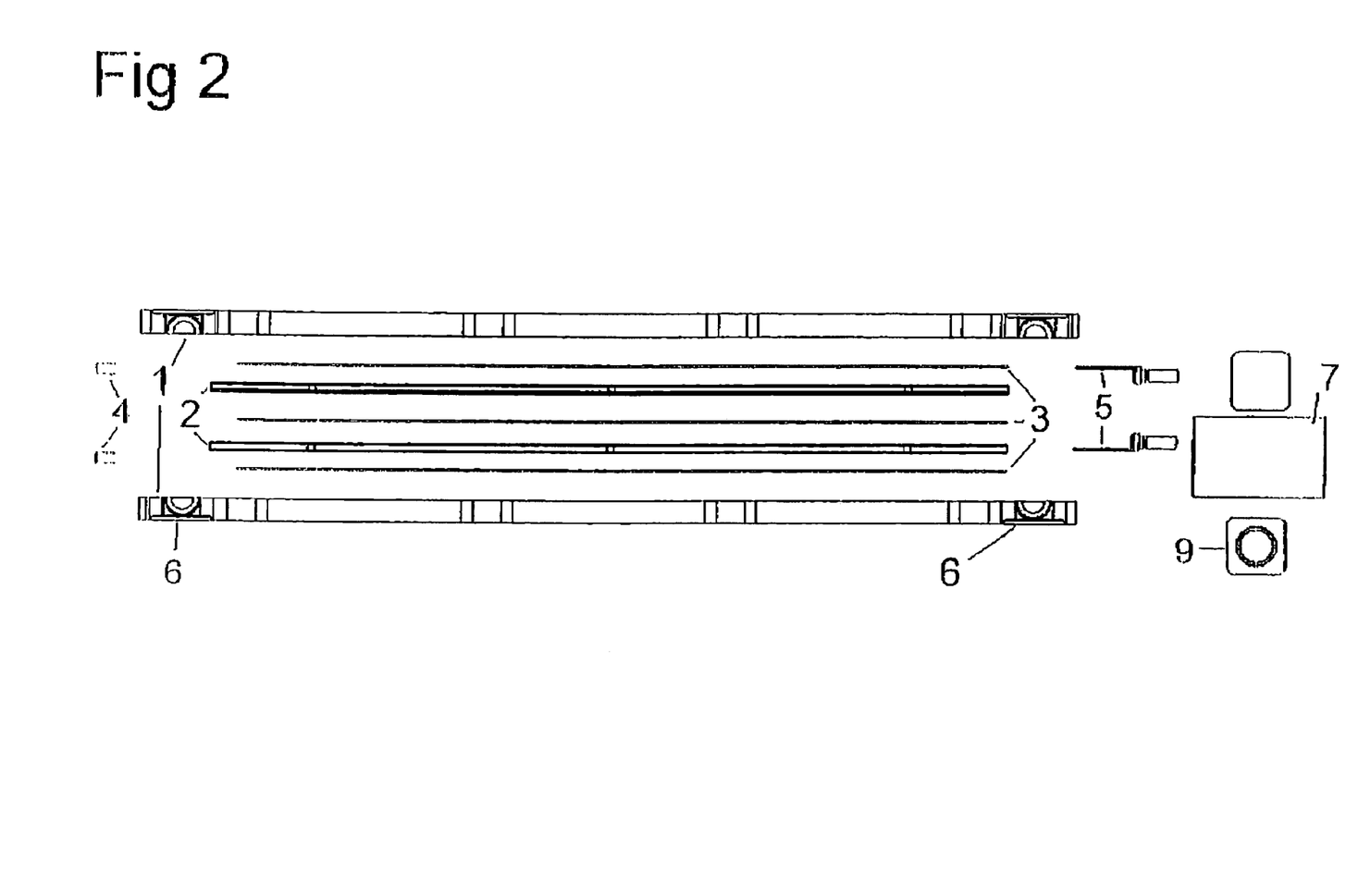
FIG. 2 shows a side view of the high-power resistor as shown in FIG. 1.
Figure 3:
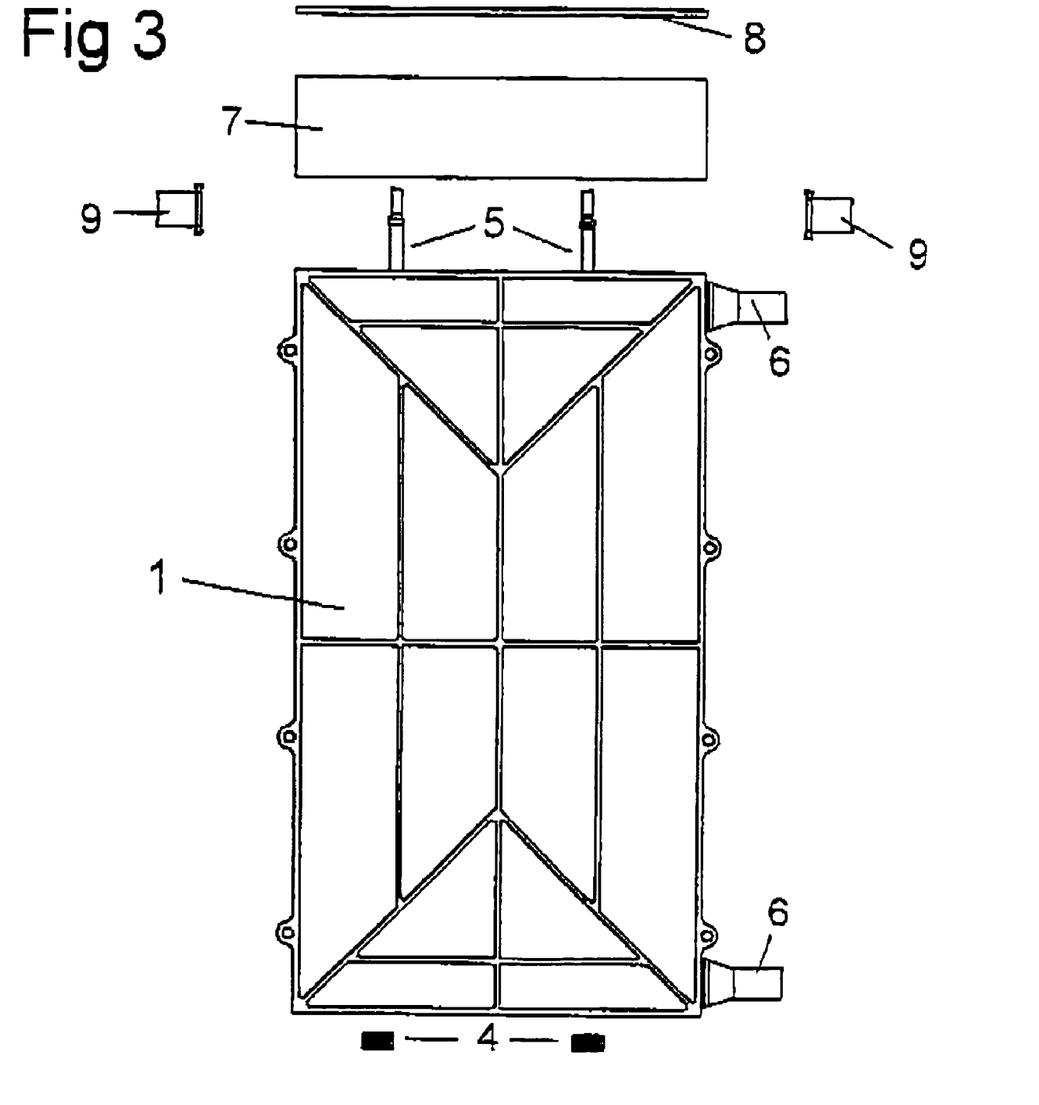
FIG. 3 shows a top view of the high-power resistor as shown in FIGS. 1 and 2.

In the housing, three resistance elements 3 are disposed. The resistance elements 3 are of planiform design. They extend parallel to and at a distance from each other. The resistance elements 3 are rectangular, the rectangle being slightly smaller than the rectangle formed by the housing parts 1.

The resistance elements 3 are separated from each other by two separators 2. The separators 2 likewise are planiform. They have a rectangular shape which is slightly larger than the rectangles of the resistance elements 3 and slightly smaller than the rectangles of the housing parts 1. The separators 2 are made of thermoplastic material. For the separators 2, the same materials can be used as for the housing parts 1. The separators 2 can be fabricated of the same material as the housing parts 1.

Connections 6, namely tube connections, are molded to the housing parts 1. The connections 6 are located at the ends of a longitudinal side of the housing parts 1. One of the connections 6 serves as inlet for a cooling medium, the other one as outlet for the cooling medium. The cooling medium is water or a water-glycol mixture or oil. Other cooling media can be used as well. The liquid cooling medium traverses the housing 1. In doing so, it cools the resistance elements 3 which are heated under the influence of the electric current. The housing parts 1 are connected with each other in a sealed and pressure-resistant way, so that no cooling medium can escape. The separators 2 conduct the cooling medium past the resistance elements 3 through the housing 1. They effect a uniform distribution of the cooling medium and a uniform cooling of the resistance elements 3.

When the resistance elements 3 should be connected in series, they are provided with connecting materials 4, which have a U-shaped design and are each welded to a resistance element 3. The connecting materials 4 then are connected with each other by an electric line (not shown in the drawing).

Figure 4:
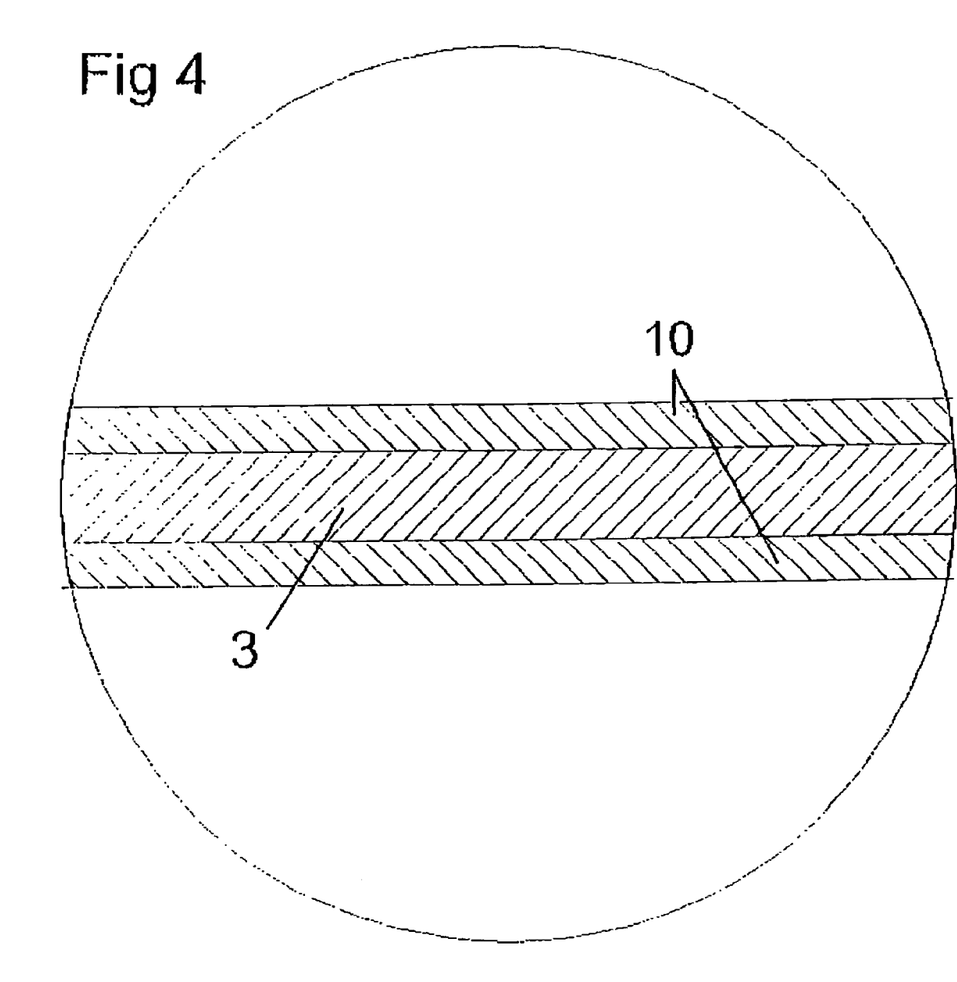
FIG. 4 shows a section through the resistance element of the high-power resistor as shown in FIGS. 1 to 3.
Figure 5:
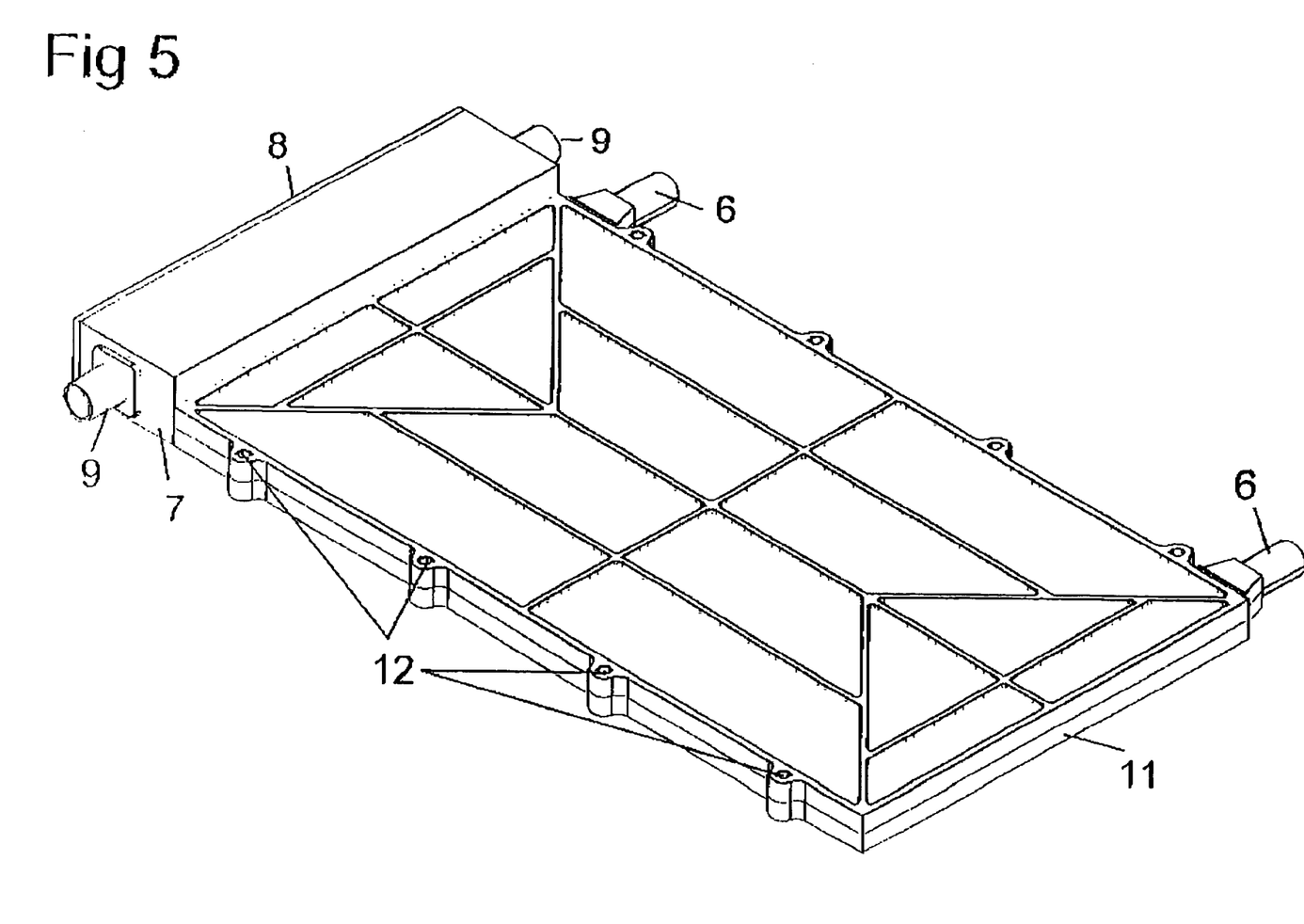
FIG. 5 shows a perspective view of the high-power resistor as shown in FIGS. 1 to 3 in the assembled condition.

FIG. 4 shows a cross-section through a resistance element 3. As can be taken from FIG. 4, the resistance element 3 is provided with a thin, electrically insulating layer 10 on both sides. The layers 10 are applied onto the resistance element 3.

At the housing 1, a terminal box 7 is provided, which is located at a narrow side of the rectangular housing 1 and whose length corresponds with the length of this narrow side. The terminal box 7 has a rectangular cross-section, its height corresponding with the height of the housing 1. The height of the terminal box 7 can, however, also be a multiple of the height of the housing, for instance twice the height (FIG. 5) or a quadruple thereof (FIG. 6).

In the side of the terminal box 7 facing the housing 1, apertures are provided, into which the connecting pins 5 can be inserted. The connecting pins 5 have O-rings in their middle, which are clamped between the wall of the terminal box 7 facing the housing 1 and a shoulder of the connecting pins 5, and which effect a sealing with respect to the housing 1. The connecting pins 5 furthermore have tongues, which project into the housing 1 and are each electrically connected with one or more resistance elements 3.

The terminal box 7 includes electrically conductive connections (not shown in the drawing) which provide for an electrically conductive connection of the parts of the connecting pins 5 projecting into the terminal box 7 with contacts 9. The contacts 9 are provided at the ends of the terminal box 7. They form sockets for plugs of the electric connecting lines for the resistance element, which can be mounted thereon. The terminal box 7 is closed by the cover 8. By removing the cover 8, the interior of the terminal box 7 is accessible. The terminal box 7 includes parts which can make the necessary connection between the resistance elements, which can be connected in series or in parallel, and the contacts 9 (not shown in the drawing).

Figure 6:
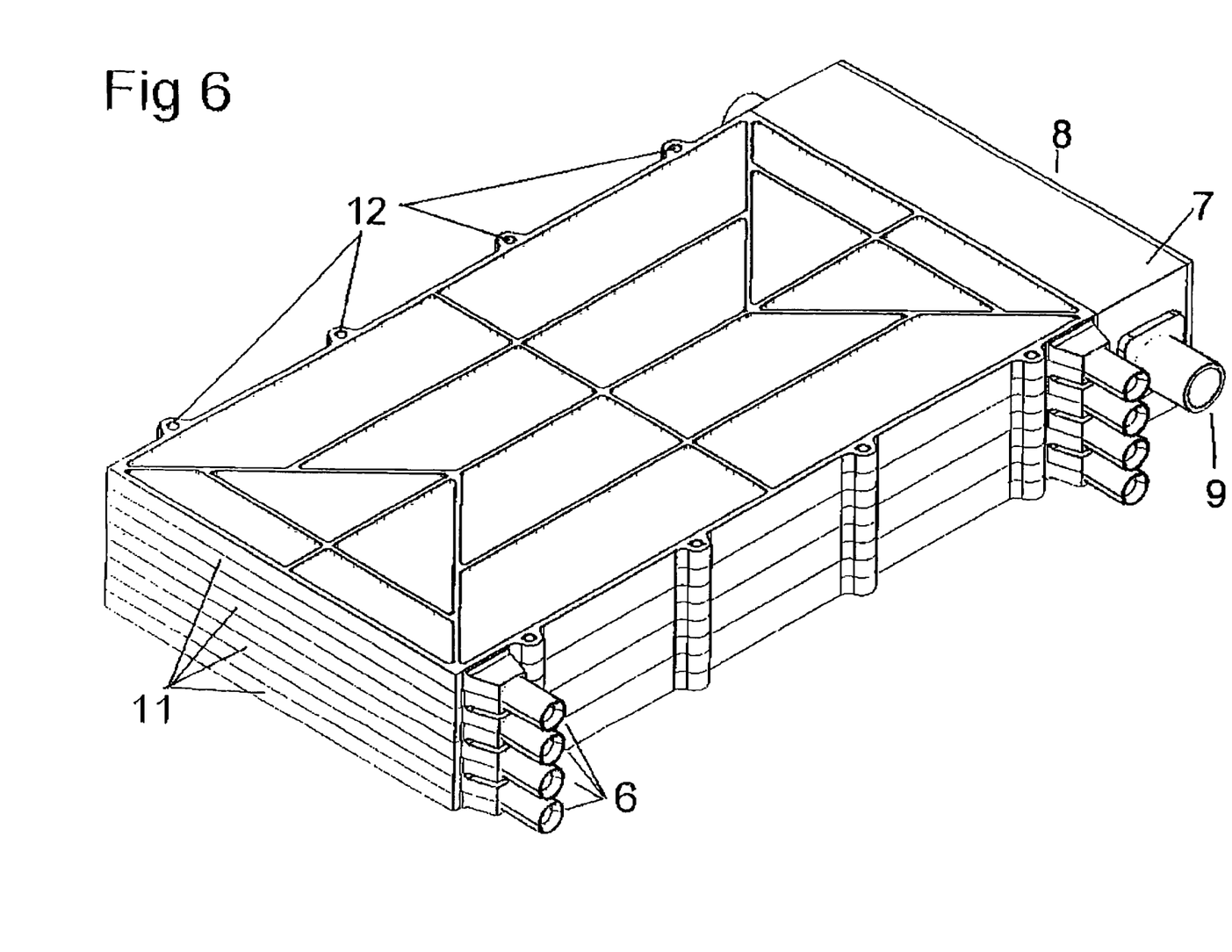
FIG. 6 shows a resistance unit which consists of four high-power resistors as shown in FIGS. 1 to 3 and 5.

FIG. 6 shows a resistance unit which consists of four high-power resistors 11. At the longitudinal sides of the resistance elements 11, there are each provided four spaced outwardly extending projections, which include holes 12 which are each aligned with each other and through which fastening elements, such as fastening screws or fastening bolts, can be inserted.

Figure 7:
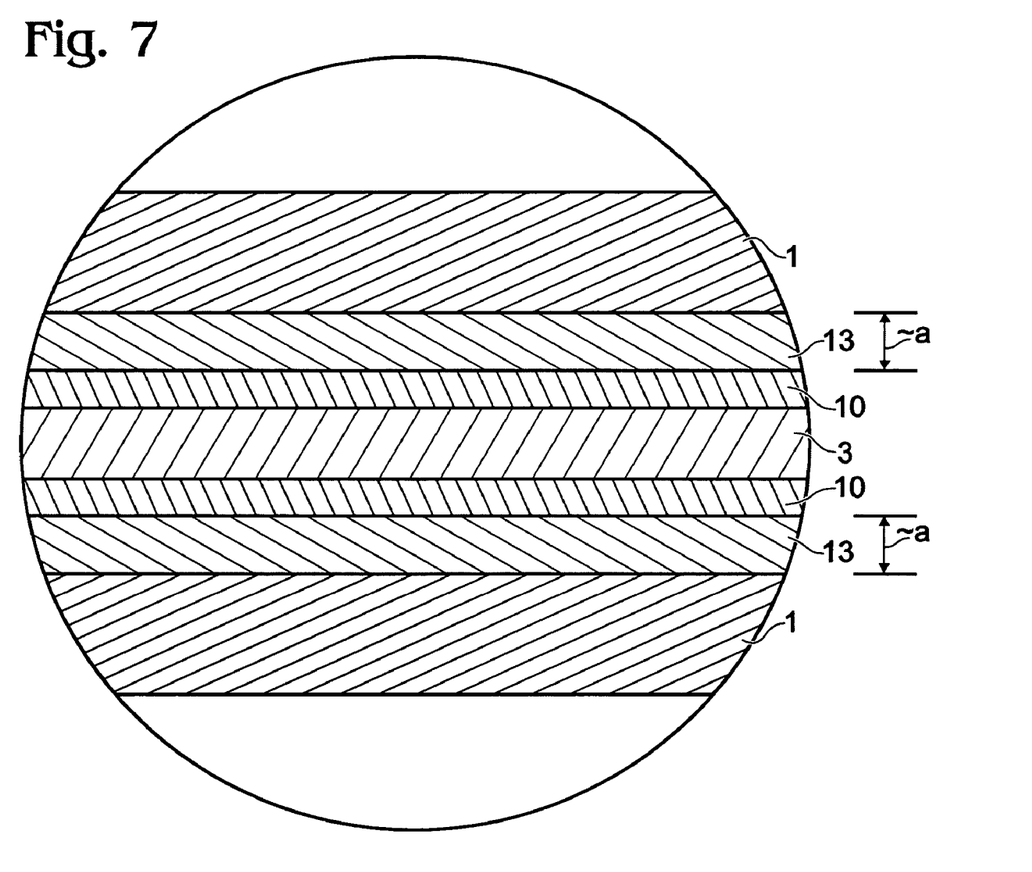
FIG. 7 shows a section through a modified embodiment of a high-power resistor.

FIG. 7 shows a modified embodiment of the high-power resistor, in which merely one resistance element 3 and no separators 2 are provided. The resistance element 3 is provided with a thin, electrically insulating layer 10 on both sides each. Between the surfaces of the layers 10 and the sides of the housing parts 1 facing each other, there is each provided a spacing (a) traversed by coolant 13.

By using plastic material, in particular thermoplastic material, the weight of the high-power resistors can be reduced considerably. The shape and the structure are also better suited for many applications, in particular in the automotive industry. The use of a cooling medium, in particular a liquid cooling medium, results in a high efficiency of the heat transfer between the resistance element(s) and the in particular liquid cooling medium.

The resistance element can be fabricated of a large flat strip of a suitable resistance material, for instance of aluminum chromium, nickel chromium, or other suitable materials. It can be molded in a simple way such that the desired resistance value and the desired power value are achieved. Useful materials include in particular aluminum chromium of the type Yhf, Y and ISE, nickel chromium 80/20, 70/30 and 30/20, but also other materials. The thickness of the material depends on the desired power distribution and the desired current; in general it is 0.25 to 0.5 mm, but smaller or larger values are also possible. The size of the resistance elements can be up to 400 mm×250 mm, and in particular cases can be even larger.

The material of the housing parts 1 and of the separators 2 is selected according to the requirements, in particular according to the type of the in particular liquid cooling medium. Particularly useful materials include thermally conductive plastic materials, in particular synthetic resins, which effect a constant and accurate electric and thermal insulation. Particularly useful materials include Protavic, L112-2, L135, L163 and L181, but also other materials.

The invention claimed is:

1. A high-power resistor with a substantially rectangular housing which can be or is traversed by a cooling medium and in which a plurality of planiform and substantially rectangular resistance elements are provided extending substantially parallel to and at a distance from each other, wherein the housing is configured to conduct the cooling medium past the resistance elements from a supply connection on the housing for supplying the cooling medium to a discharge connection on the housing for discharging the cooling medium from the housing, along substantially parallel planiform cooling medium supply paths that extend between the housing supply connection and the discharge connection.

2. The high-power resistor as claimed in claim 1, wherein three resistance elements are provided in the housing.

3. The high-power resistor as claimed in claim 1, wherein separators are provided between the resistance elements.

4. The high-power resistor as claimed in claim 1, wherein the housing is made of plastic material.

5. The high-power resistor as claimed in claim 4, wherein the housing is made of thermoplastic material.

6. The high-power resistor as claimed in claim 1, wherein a terminal box is provided at the housing.

7. The high-power resistor as claimed in claim 6, further comprising sealed connections for connecting the resistance element with the terminal box.

8. A resistance unit comprising a plurality of high-power resistors, each of the resistors, planiform in design, being provided with a substantially rectangular housing which can be or is traversed by a liquid cooling medium and in which a substantially rectangular planiform resistance element, substantially spanning the housing, is provided, wherein the housing is configured to conduct the cooling medium past the resistance element from a supply connection on the housing for supplying the cooling medium to a discharge connection on the housing for discharging the cooling medium from the housing, along substantially parallel planiform cooling medium supply paths that extend between the housing supply connection and the discharge connection.

9. The resistance unit as claimed in claim 8, wherein the resistance element is one of a plurality of resistance elements provided in the housing.

10. The resistance unit as claimed in claim 9, wherein three resistance elements are provided in the housing.

11. The resistance unit as claimed in claim 9, wherein separators are provided between the resistance elements.

12. The resistance unit as claimed in claim 9, wherein the housing is made of plastic material.

13. The resistance unit as claimed in claim 12, wherein the housing is made of thermoplastic material.

14. The resistance unit as claimed in claim 9, wherein connections for supplying and discharging the cooling medium are provided at the housing.

15. The resistance unit as claimed in claim 9, wherein a terminal box is provided at the housing.

16. The resistance unit as claimed in claim 15, further comprising sealed connections for connecting the resistance element with the terminal box.

* * * * *